United States Patent
Bitterlich et al.

(10) Patent No.: US 6,887,612 B2
(45) Date of Patent: May 3, 2005

(54) FUEL CELL

(75) Inventors: Stefan Bitterlich, Dirmstein (DE);
Hartwig Voss, Frankenthal (DE);
Andreas Fischer, Ludwigshafen (DE);
Werner Weppner, Heikendorf (DE);
Ingolf Voigt, Jena (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 475 days.

(21) Appl. No.: 10/179,199

(22) Filed: Jun. 26, 2002

(65) Prior Publication Data

US 2003/0012996 A1 Jan. 16, 2003

(30) Foreign Application Priority Data

Jun. 26, 2001 (DE) .......................... 101 30 783

(51) Int. Cl.[7] .............................. H01M 4/86
(52) U.S. Cl. ..................... 429/40; 429/41; 429/44; 429/30; 429/33
(58) Field of Search .................. 429/30, 33, 40, 429/41, 44

(56) References Cited

U.S. PATENT DOCUMENTS

| | | | |
|---|---|---|---|
| 4,751,152 A | | 6/1988 | Zymboly |
| 4,997,725 A | * | 3/1991 | Pujare et al. .................. 429/17 |
| 5,064,733 A | * | 11/1991 | Krist et al. .................... 429/17 |
| 5,543,239 A | * | 8/1996 | Virkar et al. .................. 429/33 |
| 6,489,050 B1 | * | 12/2002 | Ruhl et al. ..................... 429/26 |
| 6,821,498 B2 | * | 11/2004 | Vaughey et al. ............ 423/599 |

FOREIGN PATENT DOCUMENTS

| | | |
|---|---|---|
| DE | 198 26496 | 1/2000 |
| EP | 190 605 | 8/1986 |
| WO | 98/19351 | 5/1998 |
| WO | 99/33134 | 7/1999 |

OTHER PUBLICATIONS

J. Electro.Soc., 146(1)69–78(1999) Kim et al, no month available.
Solid State Ionics 134 (2000)3–20, Steele.
2000–117680/11—Abstract, Jun. 13, 1998.
J. Electro.Soc., VO1141, No. 2, 2/94, Watanabe et al.
86–212708/33—Abstract, Jan. 31, 1985.
Ceramica y Vidrio, Labrincha et al., 34 [5–6], 405–408(1995), no month available.
Solid State Ionics 40/41(1990) 535–538, Belzner et al, no month available.
Solid State Ionics 53–56(1992)998–1003, Taniguchi, no month available.

* cited by examiner

*Primary Examiner*—Bruce F. Bell
(74) *Attorney, Agent, or Firm*—Novak Druce & Quigg, LLP

(57) ABSTRACT

The invention relates to a fuel cell having a moderate operating temperature which comprises a cathode, an anode and an electrolyte, where at least the cathode comprises a material having the composition $(Sr_{1-x}Ca_x)_{1-y}A_yMn_{1-z}B_zO_{3-\delta}$ and A is at least one element from the group consisting of Ba, Pb, Na, K, Y and the lanthanide group, B is at least one element from the group consisting of Mg, Al, Ga, In, Sn and sub-group elements from the 4th, 5th or 6th period, and x adopts values of from 0.2 to 0.8, y adopts values of from 0 to 0.4, z adopts values of from 0 to <1, and δ adopts values which arise taking into account the electroneutrality principle.

10 Claims, No Drawings

FUEL CELL

The present invention relates to a fuel cell, in particular a solid oxide fuel cell.

Fuel cells are energy converters which convert chemical energy into electrical energy. In a fuel cell, the principle of electrolysis is reversed. Various types of fuel cell are known today, generally differing from one another in the operating temperature. However, the construction of the cells is in principle the same in all types. They generally consist of two electrodes, an anode and a cathode, at which the reactions take place, and an electrolyte between the two electrodes. This has three functions. It provides ionic contact, prevents electrical contact and in addition ensures that the gases fed to the electrodes are kept separate. The electrodes are generally supplied with gases which are reacted in a redox reaction. For example, the anode is supplied with hydrogen and the cathode with oxygen.

The types of fuel cell known at present can be divided, for example, into those which operate at relatively low temperature ($\leq 200°$ C.), for example the alkaline fuel cell, the polymer electrolyte fuel cell and the phosphoric acid fuel cell, and those which operate in the medium- and high-temperature range (from 500 to 1000° C.).

While the low-temperature fuel cells in most cases require hydrogen as fuel gas on the cathode side, the types which operate in the medium- and high-temperature range are also supplied with other fuel gases (such as methane or methanol), which undergo chemical reactions which proceed in the anode space, in particular so-called internal reforming, in which hydrogen is formed from the fuel gas. This property represents an advantage over low-temperature fuel cells since the cost otherwise necessary for the production and purification of the hydrogen is significantly reduced or eliminated entirely if the energy carrier used is not elemental hydrogen, but instead hydrogen in chemically bound form.

Medium- and high-temperature fuel cells are implemented in the form of the molten carbonate fuel cell (MCFC) and the solid oxide fuel cell (SOFC). The MCFC operates at temperatures of about 650° C. However, considerable problems arise in this type of fuel cell due to corrosion and losses of electrolyte and due to undesired changes in the electrolyte properties during the operating time. In the SOFC, the fuel gas is located in the anode space and an oxygen-containing gas (generally air) is located in the cathode space. Oxygen is converted into oxide ions with supply of electrons at the boundary between the cathode space and the cathode. The oxide ions migrate, driven by the gradient of the oxygen activity, through the oxidic electrolyte and react with the fuel gas on the anode side with release of electrons. Since the electrolyte is essentially only conductive for oxide ions, but not for electrons, charge equalization takes place via an external current circuit, which forms the basis of the suitability of the principle described for the generation of electrical energy.

Each of the electrodes thus has two functions: at the cathode, the conversion of the oxygen molecules into oxide ions has to take place, and the electrons have to be supplied; at the anode, the reaction of the fuel gas with the oxide ions has to take place, and the electrons have to be carried away.

This can be achieved firstly by making the respective electrode from an essentially electron-conducting material (usually a metal) which is applied to the electrolyte as a porous layer. The respective reaction then takes place only at the gas/electron conductor/oxidation conductor three-phase interface. This also applies to the composite structures of metallic and oxide ion-conducting materials (so-called cermets) usually used on the anode side in the customary solid oxide fuel cells.

Secondly, however, the electrode materials used can also be so-called mixed-conducting ceramic materials (see, for example, U.S. Pat. No. 4,751,152), which have high conductivity both for oxide ions and for electrons or have high oxygen diffusivity. Materials of this type can be porous or applied to the electrolyte as a dense layer. The respective reaction takes place over the entire gas-electrode interface. In particular as the cathode, mixed-conducting ceramic materials often have an advantage over metallic materials since the latter, used as cathode, have to have high oxidation stability, which means the use of expensive noble metals (for example platinum).

WO 99/33134 relates to the composition of an air electrode for a solid oxide fuel cell which has a perovskitic crystal structure having the formula $ABO_3$, where A contains mixed lanthanides and is doped with at least one element of the rare earths and an element of the alkanline earth metals, and B contains Mn and is doped with Mg, Al, Cr, Ni, Co or Fe.

The solid oxide fuel cell (SOFC) conforming to the state of the art operates at temperatures of about 950° C. This high temperature causes considerable problems, especially of a technical nature relating to the material, due in particular to corrosion of the materials used. A critical factor here is the bipolar plate necessary, in particular, in cell stacks, which has to be stable under both reducing and oxidizing conditions.

In addition, the fuel and combustion air have to be pre-heated to very high temperatures in order to avoid impermissible thermal loading of the cell ceramic. Furthermore, optimum utilization of the waste heat in power-heat coupling is made more difficult.

However, said high temperatures have hitherto been necessary in the SOFC in order to ensure adequate conductivity of the oxidic material used as electrolyte for the oxide ions that effect the charge transport. Although it is in principle possible to compensate for the increased resistance of the electrolyte layer caused by reduced conductivity of the electrolyte material by correspondingly reducing the thickness of the electrolyte layer, at least one of the electrodes must, however, then be strengthened in order to ensure adequate mechanical stability. This, however, results in fresh problems in the two electrode types described above; in porous electrodes, the diffusion path from the gas space to the three-phase interface is lengthened, resulting in power-reducing diffusion overvoltages (J.-W. Kim, A. Virkar, K.-Z. Fung, K. Metha, S. C. Singhal, J. Elektrochem. Soc. 146 (1999) 69). In the case of a noble-metal electrode, strengthening is prohibited for cost reasons.

The mixed-conducting materials that have hitherto been described as being suitable for electrodes in solid oxide fuel cells likewise require high operating temperatures in order to achieve conductivities or oxygen diffusivities which are adequate for industrial application (B. C. H. Steele, Solid State Ionics, 134 (2000) 3–20).

It is an object of the present invention to provide a fuel cell which operates at temperatures below 950° C. and in which the disadvantages inherent in the operating principle of today's fuel cells are avoided.

We have found that this object is achieved in accordance with the invention by a fuel cell having a moderate operating temperature which comprises a cathode, an anode and an electrolyte, where at least the cathode comprises a material of the composition $(Sr_{1-x}Ca_x)_{1-y}A_yMn_{1-z}B_zO_{3-\delta}$ having a perovskite structure, and A is at least one element from the group consisting of Ba, Pb, Na, K, Y and the lanthanide group, B is at least one element from the group consisting of Mg, Al, Ga, In, Sn and sub-group elements from periods 4, 5 and 6, and x adopts values of from 0.2 to 0.8, y adopts values of from 0 to 0.4, z adopts values of from 0 to <1, and $\delta$ adopts values which arise taking into account the electroneutrality principle.

The term "mean operating temperature" is taken to mean a temperature of from 300 to 800° C., preferably from 400 to 700° C., particularly preferably from 500 to 650° C.

Some materials of the composition $(Sr_{1-x}Ca_x)_{1-y}A_yMn_{1-z}B_zO_{3-\delta}$ are described in DE-A 19 826 496 and in Labrincha, J. A., Irvine, J. T. S., Bol. Soc. Esp. Cerám. Vidrio, 34 [5–6] 405–408 (1995), but not their use as cathode material in a fuel cell.

At temperatures well below 950° C., the materials have a high chemical diffusion coefficient. The chemical diffusion coefficient corresponds to the product of the diffusivity (component diffusion coefficient) and the so-called Wagner factor. The Wagner factor W for a solid in which electrical conduction takes place essentially only through one ionic species and one electronic species is defined as follows:

$$W = t_e \frac{\partial \ln a_i^*}{\partial \ln c_i^*}$$

where $t_e$ denotes the transfer number of the electrons, $a_i^*$ denotes the activity of the neutral species of the ion, and $c_i^*$ denotes the concentration of the neutral species of the ion.

B in the material of the present invention is preferably at least one of the elements vanadium, niobium and tantalum. The material comprising these elements has a high Wagner factor and consequently a high diffusion coefficient.

In a preferred embodiment of the present invention, at least the cathode of the fuel cell according to the invention comprises a material of the composition $(Sr_{1-x}Ca_x)MnO_{3-\delta}$, where y and z adopt the value 0. x particularly preferably has a value of from 0.4 to 0.6, particular preference being given to $Sr_{0.5}Ca_{0.5}MnO_{3-\delta}$, where x=0.5. This material surprisingly has an oxygen conductivity, determined from the diffusivity (component diffusion coefficient), of from $10^{-8}$ to $10^{-6}$ S/cm² (at chemical equilibrium) and an electrical conductivity of from $10^{-2}$ to $10^{-1}$ S/cm² (in air) at a temperature of only about 300° C. The diffusivity itself here is about $10^{-6}$ cm²/s. This represents a significant improvement over the perovskitic materials of the LSMO type (lanthanum-strontium-manganese oxide, possibly with doping, in particular of the B positions) known from the prior art, which have chemical diffusion coefficients which are at least two orders of magnitude below those of the calcium-strontium-manganese oxide described here (A. Belzner, T. M. Gür and R. A. Huggins, Solid State Ionics 40/41, 535–538 (1990)). However, a crucial factor for the suitability of this material as cathode material in a fuel cell according to the invention is, in particular, the chemical diffusion coefficient, which is surprisingly high for this material. It is about $10^{-6}$ cm²/s at 300° C. It is thus at least two orders of magnitude higher than in said LSMO.

In a preferred embodiment of the present invention, the electrolyte comprises at least one solid ion conductor. In general, zirconium oxide which has been cubically stabilized by doping with yttrium oxide (or calcium oxide) (YSZ) is used as electrolyte in the SOFC. However, at moderate temperatures at which the fuel cell according to the invention is employed, some other solid ion conductors have higher conductivities. The electrolyte in the present invention preferably comprises at least one material from the group consisting of TZP (tetragonal zirconia polycrystals), SSZ (scandium oxide-doped, cubically stabilized zirconium oxide), LSGM (lanthanum-strontium-gallium-magnesium oxide having a perovskite structure), CGO (gadolinium oxide-doped cerium oxide), BiCuVOx $(Bi_4V_{1.8}BiCu_{0.2}O_{10.7})$ and BiErOx $[(Bi_2O)_{0.8}(Er_2O_3)_{0.2}]$. Their ionic conductivities $\sigma$ at 500 and 600° C. are shown in the following table:

| Ion conductor | $\sigma$ at 500° C. [S/cm] | $\sigma$ at 600° C. [S/cm] | Reference |
| --- | --- | --- | --- |
| YSZ | $2.8 \cdot 10^{-4}$ | $1.6 \cdot 10^{-3}$ | [1] |
| TZP | $7.9 \cdot 10^{-4}$ | $4.6 \cdot 10^{-3}$ | [2, 3] |
| SSZ | $6.3 \cdot 10^{-3}$ | $1.6 \cdot 10^{-2}$ | [4] |
| LSGM | $7.1 \cdot 10^{-3}$ | $2.8 \cdot 10^{-3}$ | [5] |
| CGO | $1.6 \cdot 10^{-1}$ | $4 \cdot 10^{-2}$ | [6, 7] |
| BiCuVOx | $3.2 \cdot 10^{-3}$ | $9 \cdot 10^{-2}$ | [8] |
| BiErOx | $2.2 \cdot 10^{-2}$ | $1.1 \cdot 10^{-2}$ | [7] |

References:
[1] T. H. Etsell, S. N. Flengas, Chem. Rev. 70, 339 (1970)
[2] W. Weppner and H. Schubert, Adv. in Ceramics 24 (Science and Technology of Zirconia III), 837 (1988)
[3] W. Weppner, Solid State Ionics 52, 15 (1992)
[4] S. P. S. Badwal, J. Mater. Sci. 22, 4125 (1987); S. P. S. Badwal and J. Drennan, Solid State Ionics 53–56, 769 (1992)
[5] T. Ishihara, M. Honda, T. Shibayama, H. Furutani and Y. Takita, Ionics 4, 395 (1998); T. Ishihara, H. Matsuda and Y. Takity, J. Am. Chem. Soc. 116, 3801 (1994)
[6] H. L. Tuller and A. S. Nowick, J. Electrochem. Soc. 122, 255 (1975)
[7] H. Inaba, H. Tagawa, Solid State Ionics 83, 1 (1996)
[8] E. Pernot, M. Anne, M. Bacmann, P. Strobel, J. Fouletier, R. N. Vannier, G. Mairesse, F. Abraham and G. Nowogrocki, Solid State Ionics 70/71, 259 (1994)

As can be seen from the table, four of these compounds have ionic conductivities of $>10^{-2}$ S/cm even at temperatures of 600° C. However, the crucial factor, as already mentioned above, is not the specific resistance (or the specific conductivity), but the actual resistance of the layer. The electrolyte layer preferably has a thickness of from 0.1 to 100 $\mu$m, particularly preferably from 1 to 10 $\mu$m. At a layer thickness of 10 $\mu$m, which can be produced in a gas-tight manner in the case of a mixed-conducting electrode material (as described in accordance with the invention) as substrate, a resistance per unit area of 0.1 $\Omega/cm^2$ arises with a conductivity of $10^{-2}$ S/cm. At a current of 1 A/cm², a loss of $i^2R=0.1$ W/cm² follows therefrom. At an electrical power of 1 W/cm², which can be achieved at a voltage of about 1 V with said current density, this is a power loss of merely 10%, and even of only 1% at a current density of 0.1 A/cm² which is likewise of industrial interest. If the thickness of the electrolyte layer is reduced to 1 $\mu$m, an analogous calculation gives industrially usable current densities with power losses due to ohmic resistance in the electrolyte of less than 10%, even on use of conventional and relatively inexpensive materials, such as YSZ, which have conductivities of from $10^{-3}$ to $10^{-4}$ S/cm at from 500 to 600° C.

The solid ion conductors are produced as thin or thick layers using processes which are conventional in the prior art in order to keep the resistance as low as possible. The electrolyte layer can be applied to the cathode material proposed for the fuel cell according to the invention, which thus simultaneously serves as substrate (analogously to the known Siemens-Westinghouse tube technology, in which, however, porous cathode material is used as substrate in order to achieve sufficiently high diffusion rates of the oxygen toward the electrolyte).

In a further preferred embodiment of the present invention, the electrolyte comprises an oxidic solid proton conductor, for example Gd-doped barium cerate ($BaCe_{1-x}Gd_xO_{3-\alpha}$) [N. Taniguchi, K. Hatoh, J. Niikura and T. Gamo, Solid State Ionics 53–56, 998 (1992)]. In materials of this type, transport of water molecules can take place in the opposite direction to the transport of protons. In this case, a fuel gas containing carbon in elemental and/or chemically bound form reacts at the anode with water diffusing through the electrolyte with formation of hydrogen to give a gas mixture which in addition essentially comprises carbon monoxide and/or carbon dioxide. The hydrogen releases electrons with formation of protons and migrates through the electrolyte to the cathode. The protons react at the electrolyte/cathode interface with oxide ions transported through the cathode material, with formation of water, which in turn diffuses away to the anode side. If the cathode is designed in such a way that a cathode material/electrolyte/cathode gas three-phase interface is present, i.e. that it has continuous pores from the gas space to the electrolytes, some of the water vapor formed may also be transferred into the cathode space.

For the anode, a material is used which on the one hand has adequate electrical conductivity in the target temperature range and on the other hand ensures a fast chemical reaction of the ions transported through the electrolyte layer with the fuel gas. The anode material preferably comprises at least one catalytic component.

This catalyzes
the reaction of oxide ions with hydrogen with formation of water and/or
the reaction of oxide ions with carbon-containing compounds with formation of, inter alia, CO and/or $CO_2$, and/or
the reaction of water with carbon-containing compounds with formation of, inter alia, hydrogen or (with simultaneous release of electrons) of protons.

This can be achieved, for example, by making the anode of a material which essentially conducts electrons. In a preferred embodiment of the present invention, the anode comprises an electrically conductive oxide-ceramic material or a metal.

The metal is preferably nickel or a noble metal, such as platinum, ruthenium or palladium, or alloys of these metals. The anode may be applied to the electrolyte in the form of a porous layer. The respective reaction then takes place at the fuel gas/electrolyte/oxide ion conductor three-phase interface.

In a further preferred embodiment of the present invention, the anode comprises composite structures of metallic and oxide ion-conducting materials. These include, for example, those which comprise one of the materials which are suitable for the electrolyte, or mixtures of these materials, together with a material which essentially conducts electrons. A material which essentially conducts electrons is in this connection an oxide-ceramic material which conducts electrons or a metal. The metal present may be, for example, nickel or a noble metal, such as platinum, ruthenium or palladium, or alloys with these metals. Structures of this type may also advantageously be prepared using so-called nanostructured solid electrolytes, as described in WO 98/19351. The anode reaction then takes place at the fuel gas/electron conductor/oxide ion conductor three-phase interface, which is why anodes made from materials of this type preferably have a porous design. An example thereof are mixtures of CGO and La—Sr—Co—Fe oxide.

In a further preferred embodiment of the present invention, the anode comprises a mixed-conducting material with catalytically active constituents. The catalytic activity of the anode material in the above-mentioned sense is increased here by the admixture of the catalytically active constituents. Examples thereof are Sr-doped lanthanum-manganese oxide $LaMnO_3$ (LSM) or samarium-doped cerium oxide (SDC), with each of which microcrystalline Pt and Ru particles are admixed (M. Watanabe et al., J. Electrochem. Soc. 141 (1994) 342 ff.).

The anode in the present invention preferably forms a porous layer on the electrolyte. The porosity of the anode should be adequate for gas transport. Advantageous for this purpose are electrodes which have from 50 to 85% of the full theoretical density, i.e. a porosity of from 15 to 50%. The thickness of the electrodes in the present invention is preferably from 0.01 $\mu$m to 1 mm.

For the purposes of stabilization of the respective layers, interlayers, preferably of oxidic materials, may also be located between the anode and electrolyte layers and between the cathode and electrolyte layers. Interlayers of this type must of course have suitable ion-electric conduction properties. The term "suitable ion-electric conduction properties" here is taken to mean that the interlayers do not form barrier layers between the electrodes and the electrolyte, but instead have similar ion-electric conduction properties to the respective adjacent electrode or the electrolyte.

Furthermore, the fuel cell may also be constructed in such a way that all layers (anode, electrolyte and cathode) essentially uniformly comprise the material described in accordance with the invention as at least for the cathode. This is because the perovskitic materials claimed for the fuel cell in some cases have predominant ion conductivity at moderate oxygen partial pressures. It is therefore possible to use these materials to produce fuel cells comprising a single component, as described, in principle, by Weppner (EP-A 0 190 605), in which case the layers in contact with gas may also have to be doped with foreign elements. The advantage is that separate materials are unnecessary for the electrodes, and inhibition of transport of the ions through solid/solid interfaces is unnecessary. The electronic conduction in this case is caused by the oxygen partial pressures at the anode and cathode. The material is p-conducting on the cathode side and n-conducting on the anode side. Furthermore, suitable processes, such as successive coating, allow intentional production of a gradient in the composition, which leads to the above-described functionalities (cathode-electrolyte-anode) in the various zones of the layer as a whole.

The layers described above can be produced in the manner known to the person skilled in the art, for example by the sol-gel technique, slip technology, chemical vapor deposition (CVD), thermal spraying or printing techniques, if desired followed by a thermal aftertreatment step.

In order to increase the mechanical stability, the layers described above may also be applied to a porous support, in particular of metal, which, if it is electrically conductive, can simultaneously serve as current collector.

In order to produce industrially useful electric voltages, the individual cells constructed as described above can be connected in series in a manner known to the person skilled in the art, for example in the form of a cell stack with bipolar plates or by inserting tube segments into one another.

Any necessary pre-heating of the gases entering the fuel cell or the apparatus and the heat dissipation from the gases leaving the fuel cell or apparatus can likewise be carried out in a manner known to the person skilled in the art, i.e., for example, by heat exchange between supplied and discharged gas. The discharged anode gas may, if it still comprises a suitable residual content of combustible components, be employed in post-combustion with recovery of mechanical and/or thermal energy, for example in combined heat and power stations.

The fuel cell according to the invention serves for the generation of electrical energy at temperatures in the fuel cell of from 300 to 800° C., in particular from 500 to 600° C. The fuel gas used can be hydrogen, carbon monoxide, methane, one or more organic compounds or a mixture of said components. Possible organic compounds here are hydrocarbons or alcohols.

Furthermore, the present invention relates to the use of a fuel cell according to the invention for the generation of electrical energy and/or heat in a stationary unit or in cars, commercial vehicles, aircraft or submarines. In the cars, commercial vehicles, aircraft or submarines, the electrical energy can serve as propulsion and/or auxiliary energy;

We claim:

1. A fuel cell having a moderate operating temperature which comprises a cathode, an anode and an electrolyte, where at least the cathode comprises a material having the composition $(Sr_{1-x}Ca_x)_{1-y}A_yMn_{1-z}B_zO_{3-\delta}$ and A is at least one element from the group consisting of Ba, Pb, Na, K, Y and the lanthanide group, B is at least one element from the group consisting of Mg, Al, Ga, In, Sn and sub-group elements from the 4th, 5th or 6th period, and x adopts values of from 0.2 to 0.8, y adopts values of from 0 to 0.4, z adopts values of from 0 to <1, and $\delta$ adopts values which arise taking into account the electroneutrality principle.

2. A fuel cell as claimed in claim 1, wherein y and z adopt the value 0.

3. A fuel cell as claimed in claim 1, wherein x adopts values of from 0.4 to 0.6.

4. A fuel cell as claimed in claim 1, wherein B is at least one of the elements vanadium, niobium or tantalum.

5. A fuel cell as claimed in claim 1, wherein the operating temperature is from 400 to 700° C.

6. a fuel cell as claimed in claim 1, wherein the electrolyte comprises a material having the composition $(Sr_{1-x}Ca_x)_{1-y}A_yMn_{1-z}B_zO_{3-\delta}$, wherein A is at least one element from the group consisting of Ba, Pb, Na, K, Y and the lanthanide group, B is at least one element form the group consisting of Mg, Al, Ga, In, Sn and sub-group elements from the $4^{th}$, $5^{th}$, $6^{th}$, period, and "x" adopts values from 0.2 to 0.8, "y" adopts values of from 0 to 0.4, "z" adopts values of from 0 to <1, and $\delta$ adopts values, which arise, taking into account the electroneutrality principle, an oxidic oxide ion conductor or an oxidic solid proton conductor.

7. A fuel cell as claimed in claim 1, wherein the electrolyte comprises at least one material from the group consisting of TZP (tetragonal zirconia polycrystals), SSZ (scandium oxide-doped, cubically stabilized zirconium oxide), LSGM (lanthanum-strontium-gallium-magnesium oxide having a perovskite structure), CGO (gadolinium oxide-doped cerium oxide), BiCuVOx($Bi_4V_{1.8}BiCu_{0.2}O_{10.7}$) and BiErOx $[(Bi_2O)_{0.8}(Er_2O_3)_{0.2}]$.

8. A fuel cell as claimed in claim 1, wherein the anode comprises an electrically conductive oxide-ceramic material or a metal.

9. A fuel cell as claimed in claim 1, wherein the anode comprises composite structures of metallic and oxide ion-conducting materials or a mixed-conducting material with catalytically active constituents.

10. A fuel cell as claimed in claim 1, wherein the anode forms a porous layer on the electrolyte.

* * * * *

UNITED STATES PATENT AND TRADEMARK OFFICE
CERTIFICATE OF CORRECTION

PATENT NO. : 6,887,612 B2
APPLICATION NO. : 10/179199
DATED : May 3, 2005
INVENTOR(S) : Bitterlich et al.

It is certified that error appears in the above-identified patent and that said Letters Patent is hereby corrected as shown below:

Column 8,
Line 6, delete "a fuel cell as claimed in claim 1, wherein the electrolyte" and substitute -- A fuel cell as claimed in claim 1, wherein the electrolyte --.
Line 10, delete "B is at least one element form the group consisting of Mg," and substitute -- B is at least one element from the group consisting of Mg, --.
Line 17, delete "δadopts values, which arise, taking into account the" and substitute -- δ adopts values, which arise, taking into account the --.

Signed and Sealed this

Twenty-seventh Day of June, 2006

JON W. DUDAS
*Director of the United States Patent and Trademark Office*